United States Patent [19]

Bühl et al.

[11] 4,110,425

[45] Aug. 29, 1978

[54] FORM RETAINING HYDROGEN-STORING MATERIAL

[75] Inventors: Horst Bühl, Weinstadt; Susanne Will, Esslingen, both of Germany

[73] Assignee: Deutsche Automobilgesellschaft GmbH, Hanover, Germany

[21] Appl. No.: 740,069

[22] Filed: Nov. 8, 1976

[30] Foreign Application Priority Data

Nov. 11, 1975 [DE] Fed. Rep. of Germany ....... 2550584

[51] Int. Cl.$^2$ ........................... C01B 1/32; C01B 1/35
[52] U.S. Cl. ................................ 423/648 R; 252/184; 252/430; 264/111; 423/248
[58] Field of Search ................ 264/111; 252/184, 430; 428/407; 55/68, 74; 423/648 R, 248

[56] References Cited

U.S. PATENT DOCUMENTS

| | | | |
|---|---|---|---|
| 2,933,455 | 4/1960 | Doying | 252/430 |
| 3,091,550 | 5/1963 | Doying | 252/430 |
| 3,166,615 | 1/1965 | Farrell | 264/111 |
| 3,539,672 | 10/1970 | Valyi | 264/111 |
| 3,669,745 | 6/1972 | Beccu et al. | 429/206 |
| 3,803,043 | 4/1974 | Magladry et al. | 264/111 |
| 3,881,960 | 5/1975 | Haschka et al. | 429/101 |
| 4,036,944 | 7/1977 | Blytas | 252/430 |

*Primary Examiner*—Benjamin R. Padgett
*Assistant Examiner*—Deborah L. Kyle
*Attorney, Agent, or Firm*—Browdy & Neimark

[57] ABSTRACT

A hydrogen-storing material of known type, e.g. Mg, Ti, V, Nb, and alloys such as La-, Ti- and Co- alloys, is made form retaining without significant loss of hydrogen absorption and desorption properties by binding with a plastic having sufficient adhesion or binding strength. The hydrogen-storing material in granular form is mixed with the plastic in powder, emulsion, solution or melt form and then molded into the desired shape.

20 Claims, No Drawings

FORM RETAINING HYDROGEN-STORING MATERIAL

FIELD OF THE INVENTION

The invention relates to a form retaining hydrogen-storing material, and particularly to fine-grained, hydrogen-storing material which is bound in such a manner that the tendency of such material to corrode is eliminated. The present invention also relates to the use of hydrogen-storing material bound in this manner in hydrogen-storing devices.

BACKGROUND OF THE INVENTION

Various metals and metal alloys absorb hydrogen which can be desorbed once again when the temperature and pressure conditions of absorption are reversed.

Such systems constitute technically valuable possibilities for hydrogen storage, which have the particular advantage of smaller volume relative to storage of hydrogen in compressed gas bottles.

Hydrogen-absorbent materials are known. These include both pure metals such as Mg, Ti, V, and Nb, and alloys, for example, La-, Ti- and Co-alloys, such as Ti-Ni alloys, La-Co alloys, Fe-Ti alloys and La-Ni alloys, as well as Zr-Ni alloys, Mg-Ni alloys, Mg-Cu alloys, rare earth-Ni alloys, rare earth-Co alloys and mixtures of these. Examples include $Mg_2Ni$, $Ti_2Ni$, $LaNi_5$, $LaCo_5$ and FeTi. The temperature and pressure conditions for hydrogen uptake and release can differ considerably, depending on the nature of the hydrogen-storing material. A common feature of all materials, however, is that the stored hydrogen occupies crystal lattice sites in the storage material, i.e., a hydride phase is formed in contrast to adsorptive storage by hydrogen uptake.

An important technical shortcoming of storage systems of this kind is that these substances undergo a constant reduction of grain size as a cyclic consequence of hydrogen uptake and release due to the associated volume change in the metal lattice, and this continues until the volume changes can be balanced by the elasticity of the crystal lattice. At this point the grain size is approximately 1 micron.

Even when originally compact metals or alloys are employed, the latter are frequently converted to fine powder by cyclic hydration-dehydration processes. This circumstance has been used for a long time for the manufacture of metal powders (Zr, Ta) which are otherwise difficult to obtain.

If no precautions are taken, loose powder is obtained due to the familiar pulverization of material during rapid desorption of the hydrogen, known as the "fountain effect," which can cause the bulk material to be carried out of the container in small diameter pipes at high gas output velocity. Even during slow desorption, very fine particles can be drawn into valves and connected systems, causing contamination and leakage of the equipment. Because of the tendency toward plugging the pores, built-in filter plates are viewed only as makeshift devices.

It is known to mechanically harden a hydrogen storage electrode made of titanium hydride in such manner that certain metals, including nickel, are alloyed in it or on it. The metal hydride powder is sintered at 700°-1000° C along with the powdered metal which provides mechanical strength (U.S. Pat. No. 3,669,745). It is also known to envelop by surface contact the hydrogen-storing material with a material which is inactive as regards hydrogen storage, but which is however highly permeable to hydrogen, wherein the hydrogen-storing material is completely covered with a layer of the protective enveloping materials; or a powder made of the hydrogen-storing material and the protective enveloping material is mixed together, pressed into a mold, and subsequently hot pressed to completely envelop the hydrogen-storing material which is then in the form of discrete grains in a coherent matrix made of the protective material (U.S. Pat. No. 3,881,960).

The first proposed solution cited hereinabove does not provide satisfactory mechanical strength to the hydrogen-storing material, and even causes the electrode to corrode more rapidly and turn to powder if unusually high amounts of nickel are not present. Furthermore, such high amounts of nickel have a significant negative effect on the hydrogen-storing properties of the storage material because the surface of the hydrogen-storing material is no longer available for the hydrogen to pass through. Also the high sintering temperatures involved in manufacture constitute an expensive and cumbersome manufacturing step.

The second proposal produces excellent dimensionally stable hydrogen-storing material, but the cost of the $TiNi_3$ which is conventionally used as the coating material and the care which must be exercised during manufacture in order to reduce a coating for the active hydrogen-storing material which covers the entire surface is likewise costly from the practical standpoint and can be carried out in simple fashion only in the case of nickel-titanium alloys. Moreover, one cannot always be sure that there will be no reaction of the hydrogen-storing material with the added metals or alloys at the suggested sintering temperatures.

SUMMARY OF THE INVENTION

It is an object of the invention to overcome the deficiencies of the prior art, such as noted above.

It is another object to provide for improved hydrogen gas storage.

It is a further object to provide an improved hydrogen gas storage means.

It is still a further object to provide a method of making an improved hydrogen gas storage means.

The remarkable finding has now been made that fine-grained hydrogen-storing materials may be cemented or compressed with plastics into compact bodies without losing their storage capacity and without a significant reduction of the possible desorption rate.

The volume-change forces which occur during absorption of the hydrogen are tolerated by the plastic, even when present in relatively small amounts, and the plastic binds the fine powder which may result from possible breaking up of the grains.

It is advantageous not to process all of the storage material into a single plastic-bound body, but to increase the sorption rate in granular material, pellets, disks or other shapes, which are no longer entrained in the gas flow owing to their size and weight, but which can be easily held back by screens, sieves, or other large-pored filter media. At high desorption rates and high packing densities, bodies having gas channels therethrough, such as honeycombed bodies with small channels in the flow direction of the desorbed hydrogen, constitute a preferred embodiment. The material which serves for uptake and release of gaseous hydrogen is to be distinguished from hydrogen-storing electrodes.

DETAILED DESCRIPTION OF PREFERRED EMBODIMENTS

The proper choice of the plastic binder depends on both kinetic and thermodynamic characteristics of the hydrogen absorbing material and, accordingly, tests for selection of a suitable binder have to consider both respects.

Sorption/desorption behaviour of a hydrogen storage material is usually discussed and published in the form of pressure-composition isotherms. These are a set of curves showing the equilibrium hydrogen pressure versus composition, i.e. hydrogen content, of the storage material, each curve being measured for a different temperature which is kept constant during measurement. A large hydrogen storage capacity corresponds to a large change in composition and hence to an isotherm with one or more sections of relatively small pressure change. In selecting the operating temperature for a given storage material in a hydrogen storage device, one looks for the isotherm relating maximum change of composition to minimum pressure change. Since strictly isothermal operation is generally not feasible nor desirable, one has to allow for variations in temperature, so that a set of isotherms with a lower and an upper temperature limit is crossed by the non-isothermal pressure-composition curve in sorbing or desorbing hydrogen. The first condition the plastic binder must fulfill is that it maintains its binding properties at the operating temperature, usually selected from published data according to the above-mentioned aspects. Thus, a routine test is accordingly made by preparing a plastic-bonded storage material, enclosing this in a suitable pressure vessel of known volume fitted with valves for hydrogen gas inlet and outlet and with means for measuring the pressure of said hydrogen gas in said vessel and for measuring the temperature of said storage material inside the vessel, and with means for maintaining a certain constant temperature, in particular the upper and lower limiting temperatures of operation, pressurizing the vessel with hydrogen up to the equilibrium pressure for the desired hydrogen content and for the upper temperature limit, so that a corresponding amount of hydrogen is absorbed by the plastic-bonded storage material, desorbing said hydrogen by pressure release or pumping at the lower temperature limit, and determining the amount of hydrogen sorbed by pressure readings. This sorption/desorption procedure is repeated again and again and the amount of hydrogen delivered by the storage material is measured for every sorption/desorption cycle, until it is sufficiently established that the hydrogen storage capacity remains constant; a hundred cycles are usually sufficient. The vessel is then opened and the interior and the valves are inspected for loose unbound storage material. With an appropriate plastic binder, capacity loss and loose unbound material should be minimal. The second condition the plastic binder must fulfill is that the sorption/desorption rates for the bonded material are comparable with those for unbonded hydrogen storage material, i.e. the speed of the reaction is not unduly hindered. The routine test for this condition is made part of the aforementioned cyclic sorption/desorption test in a simple way by noting the time taken for sorption or desorption, respectively, and comparing this to either known data for the pure storage material or measuring these kinetic data in the said device without plastic binder.

Since plastics are generally not stable above 350° C, this should be considered the upper temperature limit for the form-retaining hydrogen storage material according to the invention. The upper limit of operation may be evaluated by the well known NST (no strength temperature) test. To prevent loss of coherence, the NST-value of the plastic binder should be higher than the upper limit of operating temperature. Inorganic binders are generally not suitable as binders for lack of elasticity.

Non-limitative examples of such plastics include, either individually or in a compatible mixture: polyolefins, especially polyethylene, polypropylene, polybutylene and their copolymers, especially with ethylacrylate and/or vinyl acetate; vinylcarbazole polymer; polyvinylacetate; polyether; polyhalogenated hydrocarbons, especially vinyl chloride polymers, polytetrafluoroethylene, polyfluoroethylenepropylene (PFEP), polychlorotrifluoroethylene, polyvinyl difluoride, polyvinyl fluoride and their copolymers; polyamides; polyimides; polypropylene oxide; epoxy resins; polysulfone; polyacetate; polycarbonate; polyester; cellulose ester; or silicone.

Particularly temperature-resistant compositions can be achieved by cementing or sintering the hydrogen-storing powders with heat resistant plastics, such as polytetrafluoroethylene, polyphenylene sulfide, polyphenylene oxide, polycarbonate, polyimides or silicones, which are consequently preferred.

In many cases it is appropriate to keep water away from the storage material; otherwise, disturbance of the sorption-desorption process or corrosion of the storage material could occur. In such cases, hydrophobic plastics, such as polyolefins or polyfluorohydrocarbons, are to be preferred. Depending from the use envisaged, f.i. use at elevated temperatures or high elasticity, plastics such as polyfluorohydrocarbons, polyolefins, and polyimides are preferred.

Manufacture is simple and therefore inexpensive; the hydrogen-storing substances are reduced in size by known methods such as grinding or cyclic hydrogen uptake and release to preferred grain sizes, especially 5–200 microns, and especially 25–50 microns, and then mixed with the binder in a hydrided, partially hydrided, or dehydrided state, and molded, if necessary, with heating. The binder can also be mixed in the liquid form as well as the solid form, i.e., as a solution, dispersion (aqueous or nonaqueous) or melt, wherein any solvent or dispersant is evaporated away or pressed out during or after the mixing procedure or is evaporated after molding. The mixture may be formed to any shape by any method known for molding plastics containing heavy loads of fillers or for molding ceramic articles, including pelletizing and granulation.

The amount of plastic compound in a finished hydrogen-storing substance depends on the metal and its grain size as well as on the type of plastic and the manufacturing process. A routineer would have no difficulty in determining the necessary amount of plastic by simple tests to achieve a desired consistency of the mixed powder or the necessary strength of the molded piece. Naturally, smaller amounts of emulsified or meltable plastics are required than of plastics which must be sintered. In general, the amount of plastic should be kept as small as possible and should not exceed 50% by volume of the finished storage material.

Naturally, the amount decreases inversely with the coarseness of the original grains used. The preferred amount is generally 2–25%; it is normally advantageous, in the case of an original powder with a grain size from 5–50 microns, to bind with 4–10% emulsified or meltable plastic or cement solutions (for grain sizes of approximately 50–200 microns, 2–6%.

In the case of plastic powders which must be sintered, an amount of about ten times larger is preferred, preferably 10–25%. This means that 2–3% of a plastic in an emulsion has the same effect as about 20% of a finely particulate plastic powder.

The grain size of the metal storage medium should be as small as reasonably possible before it is mixed with plastic, and should not exceed 200 microns, since the larger grains will break up during the subsequent cyclic hydrogen uptake and release, and grains which are not bound may be partially pulverized. Owing to the difficulty of handling them and their possible pyrophoricity, grain sizes smaller than 5 microns should be avoided. It is preferable to use grain sizes of about 25–50 microns for binding grains with emulsions, and 10–25 microns when plastic powder is used.

It is not known why there is hardly any reduction of the possible desorption rate during the binding of such hydrogen-storing materials with plastic, since one would expect that the absorption and desorption rates would be considerably reduced owing to the extensive coating of the surfaces of the storage material, and under certain circumstances (for example, if coating were encompassing) would have a considerable effect on the storage capacity. However, this is surprisingly not the case.

The invention is described in greater detail with reference to the following non-limitative embodiments:

EXAMPLE 1

10 g of $LaNi_5$ are ground to a grain size of less than 50 microns and mixed with 0.6 ml of a 60% PTFE emulsion (Hostaflon TF 5032, Cehm. Werke Hoechst). The mixture is processed at 60° C for 4 hrs. in a drying chamber and then pressed into small disks (1 cm in diameter) at a pressure of 2 tons/cm$^2$.

The storage material is activated by evacuating the storage container five times and them adding hydrogen up to a pressure of 20 bars $H_2$.

EXAMPLE 2

10 g of $LaNi_5$ are ground to a grain size of less than 50 microns and mixed with 0.6 ml of a 60% PTFE emulsion (Hostaflon TF 5032, Chem. Werke Hoechst). The still damp substance is extrusion molded into shapes about 10 cm long, hexagonal or round (6 cm in diameter), with round gas outlet channels running in the flow direction, and then dried for more than 4 hrs. at 60° C in a drying chamber. Activation is the same as in Example 1 above.

EXAMPLE 3

10 g of $LaNi_5$, screened to grain size of less than 25 microns, are mixed with 2 g of polyethylene (less than 5 microns) and with 0.2 ml of a 40% PTFE emulsion (Hostaflon TF 5033, Chem. Werke Hoechst); the mixture is then molded into small disks (1 cm in diameter) at 2 t/cm$^2$ and dried. Activation is as in Example 1 above.

After 10 absorption-desorption cycles, with an adsorption time of 1 hour at 22° C and 20 bars $H_2$ pressure, the absorbed amount of hydrogen is determined by desorption at 50° C.

90–92% of the theoretically possible amount of hydrogen was absorbed, based on the formula $LaNi_5H_6$.

Studies after 100 cycles showed no harmful loss of powder. The molded forms remained stable.

It will be obvious to those skilled in the art that various changes may be made without departing from the scope of the invention and the invention is not to be considered limited to what is described in the specification.

What is claimed is:

1. In a hydrogen-storing composition including hydrogen-storing material consisting of metals or alloys which are comminuted when used reversibly as a hydrogen-storing medium by alternating absorption and desorption with hydrogen gas, the improvement whereby the composition is made from retaining, wherein:
    said hydrogen-storing material in the form of granules having a grain size of 5–200 microns is bound in a shaped form with a plastic having a desired adhesion or binding strength said plastic being present in an amount sufficient to bind said granules with sufficient strength without significantly affecting the hydrogen absorbing and desorbing properties thereof.

2. A composition in accordance with claim 1, wherein said hydrogen-storing material granules are completely or partially dehydrided or completely hydrided when bound with said plastic.

3. A composition in accordance with claim 1, wherein said hydrogen-storing material is selected from the group consisting of Ti-Ni alloys, Zr-Ni alloys, Fe-Ti alloys, Mg-Ni alloys, Mg-Cu alloys, La-Ni alloys, La-Co alloys, rare earth-Ni alloys, rare earth-Co alloys and mixtures thereof.

4. A composition in accordance with claim 1, wherein said plastic is a polyolefin or a copolymer including an olefin as a reacted monomer; vinylcarbazole polymer; polyvinylacetate, polyether, a polyhalogenated hydrocarbon, or a copolymer including a polyhalogenated hydrocarbon; a polyamide; a polyimide; polysulfone; polyester; cellulose ester; silicone; polyphenylene sulfide; or a compatible mixture thereof.

5. A composition in accordance with claim 4, wherein said plastic is polyethylene, polypropylene or polybutylene or a copolymer thereof with ethylacrylate and/or vinyl acetate, vinylcarbazol polymer, polyvinylacetate, polypropylene oxide, an epoxy resin, polyphenylene oxide, a polyhalogenated hydrocarbon selected from the group consisting of a vinyl chloride polymer, polytetrafluoroethylene, PFEP, polychlorotrifluoroethylene, polyvinyl difluoride, and polyvinyl fluoride, a copolymer including one of said polyhalogenated hydrocarbons, a polyamide, a polyimide, polysulfone, polyacetate, polycarbonate, cellulose ester, silicone, polyphenylene sulfide or a compatible mixture thereof.

6. A composition in accordance with claim 1, wherein said plastic-bound granules are molded into the shape of bodies having gas channels therethrough in the flow direction of the desorbed hydrogen.

7. A composition in accordance with claim 1, wherein said plastic is polytetrafluoroethylene.

8. In the method of storing hydrogen comprising absorbing and desorbing, said hydrogen in hydrogen-storing metals, or metal alloys, in form of shaped bodies, the improvement whereby the life of said shaped bodies of hydrogen-storing metals or metal alloys is improved, wherein:

said hydrogen-storing metal or metal alloy is provided in the form of the composition of claim 1.

9. A process for the manufacture of a hydrogen storing material consisting of metals or alloys which are comminuted when used reversibly as a hydrogen-storing medium by alternating absorption and desorption with hydrogen gas, in accordance with claim 1, comprising:

homogeneously mixing said hydrogen storing material having a grain size of 5–200 microns with said plastic in the form of fine powder or as a suspension, emulsion, solution or melt, said plastic being present in an amount of up to 50% by volume of the finished material; and shaping the mixture into the desired shape, wherein any solvent or suspending phase is substantially removed before or after shaping.

10. A process in accordance with claim 9, wherein said compressing step comprises molding in a mold.

11. A process in accordance with claim 9, wherein said plastic is added in the form of an emulsion or a solution.

12. A process in accordance with claim 11, wherein said emulsion is a polytetrafluroethylene emulsion.

13. A process in accordance with claim 11, wherein said plastic is added in an amount of 2–10% by weight based on the hydrogen-storing material.

14. A process in accordance with claim 9, wherein the plastic is added in the form of a powder with a particle size smaller than 5 microns.

15. A process in accordance with claim 14, wherein said plastic is added in an amount of 10–25% by weight based on the hydrogen-storing material.

16. A process in accordance with claim 9, wherein plastic is added in the form of a powder as well as in the form of an emulsion or solution.

17. A process in accordance with claim 9, wherein the plastic is added in the form of a melt.

18. A process in accordance with claim 9, further including the step of processing the plastic-bound hydrogen-storage material to produce a granular material, pellets, disks, honeycombed shapes or films.

19. A process in accordance with claim 9, further including the step of processing the plastic-bound hydrogen-storage material to produce a coarse-grained powder.

20. A process in accordance with claim 9, further including the step of:

sintering the body formed by said shaping step.

* * * * *